(12) United States Patent
Duan et al.

(10) Patent No.: US 10,077,986 B2
(45) Date of Patent: *Sep. 18, 2018

(54) STORING TRAJECTORY (71) Applicant: INTERNATIONAL BUSINESS MACHINES CORPORATION, Armonk, NY (US)

(72) Inventors: Ning Duan, Beijing (CN); Peng Ji, Shanghai (CN); Zhi Hu Wang, Beijing (CN); Jun Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/647,706

(22) Filed: Jul. 12, 2017

(65) Prior Publication Data
US 2017/0307384 A1    Oct. 26, 2017

Related U.S. Application Data (63) Continuation of application No. 14/868,921, filed on Sep. 29, 2015, now Pat. No. 9,739,620.

(30) Foreign Application Priority Data

Sep. 29, 2014 (CN) .......................... 2014 1 0515988

(51) Int. Cl.
*G01C 21/26* (2006.01)
*G08G 1/052* (2006.01)

(52) U.S. Cl.
CPC ............. *G01C 21/26* (2013.01); *G08G 1/052* (2013.01)

(58) Field of Classification Search
CPC ...... G01C 21/14; G01C 21/343; G01C 21/26; G08G 1/052
See application file for complete search history.

(56) References Cited

U.S. PATENT DOCUMENTS 6,317,686 B1    11/2001  Ran
7,949,491 B2     5/2011  Smartt et al.
(Continued)

FOREIGN PATENT DOCUMENTS

WO    2010042708    4/2010

OTHER PUBLICATIONS

Renchu Song et al., "Press: A Novel Framework of Trajectory Compression in Road Networks", Proceedings of the VLDB Endowment, vol. 7, Issue 9, May 2014 pp. 661-672.
(Continued)

*Primary Examiner* — Hussein A El Chanti
(74) *Attorney, Agent, or Firm* — F. Chau & Associates, LLC (57) ABSTRACT

An embodiment of the present invention provides a method for storing trajectory. The method includes: mapping, based on a plurality of positions on a trajectory of an entity, the trajectory to at least one road segment in a road network; identifying an entry point and an exit point of one of the road segments, wherein the entry point is a point where the entity starts traveling along the road segment, and the exit point is a point where the entity ends traveling along the road segment; and storing data related to at least one of the entry point and the exit point, to store the road segment as a part of information of the trajectory.

16 Claims, 5 Drawing Sheets

(56) References Cited

U.S. PATENT DOCUMENTS

| | | |
|---|---|---|
| 8,249,807 B1 | 8/2012 | Barbeau et al. |
| 8,457,880 B1 | 6/2013 | Malalur et al. |
| 9,739,620 B2 * | 8/2017 | Duan .................... G01C 21/26 |
| 2008/0215237 A1 | 9/2008 | Perry |
| 2009/0228196 A1 | 9/2009 | Raab |
| 2011/0184640 A1 | 7/2011 | Coleman et al. |
| 2011/0313648 A1 | 12/2011 | Newson et al. |
| 2013/0110392 A1 | 5/2013 | Kosseifi et al. |
| 2014/0148970 A1 | 5/2014 | Dufford et al. |
| 2014/0277971 A1 | 9/2014 | Oshiro et al. |
| 2015/0219468 A1 | 8/2015 | Ziezold et al. |
| 2016/0084666 A1 | 3/2016 | Dzyuba et al. |
| 2016/0093208 A1 | 3/2016 | Duan et al. |

OTHER PUBLICATIONS

Despina Kopanaki et al., "A Framework for Mobility Pattern Mining and Privacy-Aware Querying of Trajectory Data", HDMS '12, Jun. 28-29, 2012, Chanla, Crete, Greece.

U.S. OA dated Aug. 1, 2016 in corresponding U.S. Appl. No. 14/868,921.

* cited by examiner

STORING TRAJECTORY

CROSS-REFERENCE TO RELATED APPLICATION

This application is a Continuation of U.S. application Ser. No. 14/868,921 filed on Sep. 29, 2015, which claims priority to and the benefit of Chinese Patent Application No. 201410515988.5 filed in the Chinese Patent Office on Sep. 29, 2014, the disclosure of which is incorporated by reference herein.

BACKGROUND

The present invention relates to the field of trajectory data storage. In various fields such as vehicle networking, intelligent transportation, and position-based services, the trajectory of a moving entity (e.g., a person or a vehicle) always needs to be recorded. For example, many devices such as vehicles, mobile phones, tablet computers, and personal digital assistants (PDA) have already been equipped with a global positioning system (GPS) or other navigation/positioning systems. When a vehicle or pedestrian travels along a particular route, the navigation/positioning system can continuously or periodically collect position data to form a trajectory.

Traditionally, position data of a plurality of positions on a trajectory are directly stored in a database. The stored data, for example, may comprise latitude/longitude and altitude coordinates of each position, the time when the entity passes the position, and the speed at which the entity passes the position. However, the volume of data that needs to be stored is tremendous. For example, in order to record trajectories of 1000 vehicles within one day, over 20 gigabytes of data needs to be stored every day, which is a huge burden on storage resources. Moreover, a user likely needs to query the stored trajectory data later. For example, the user likely wants to query a trajectory of a given entity within a particular period of time or the time of arrival at a particular position. However, the tremendous data size poses a great challenge for real-time query.

SUMMARY

An exemplary embodiment of the present invention provides a method for storing a trajectory. The method includes: mapping, based on a plurality of positions on a trajectory of an entity, the trajectory to at least one road segment in a road network; identifying an entry point and an exit point of one of the road segments, wherein the entry point is a point where the entity starts traveling along the road segment, and the exit point is a point where the entity ends traveling along the road segment; and storing data related to at least one of the entry point and the exit point, so as to store the road segment as a part of information of the trajectory.

An exemplary embodiment of the present invention provides a system for storing a trajectory. The system includes: a processor configured to map, based on a plurality of positions on a trajectory of an entity, the trajectory to at least one road segment in a road network, configured to identify an entry point and an exit point of one of the road segments, wherein the entry point is a point where the entity starts traveling along the road segment, and the exit point is a point where the entity ends traveling along the road segment; and a storage device configured to store data related to at least one of the entry point and the exit point, so as to store the road segment as a part of information of the trajectory.

BRIEF DESCRIPTION OF THE SEVERAL VIEWS OF THE DRAWINGS

Through the more detailed description of some embodiments of the present disclosure in the accompanying drawings, features of the present disclosure will become more apparent, wherein.

DETAILED DESCRIPTION

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

Figure 1:
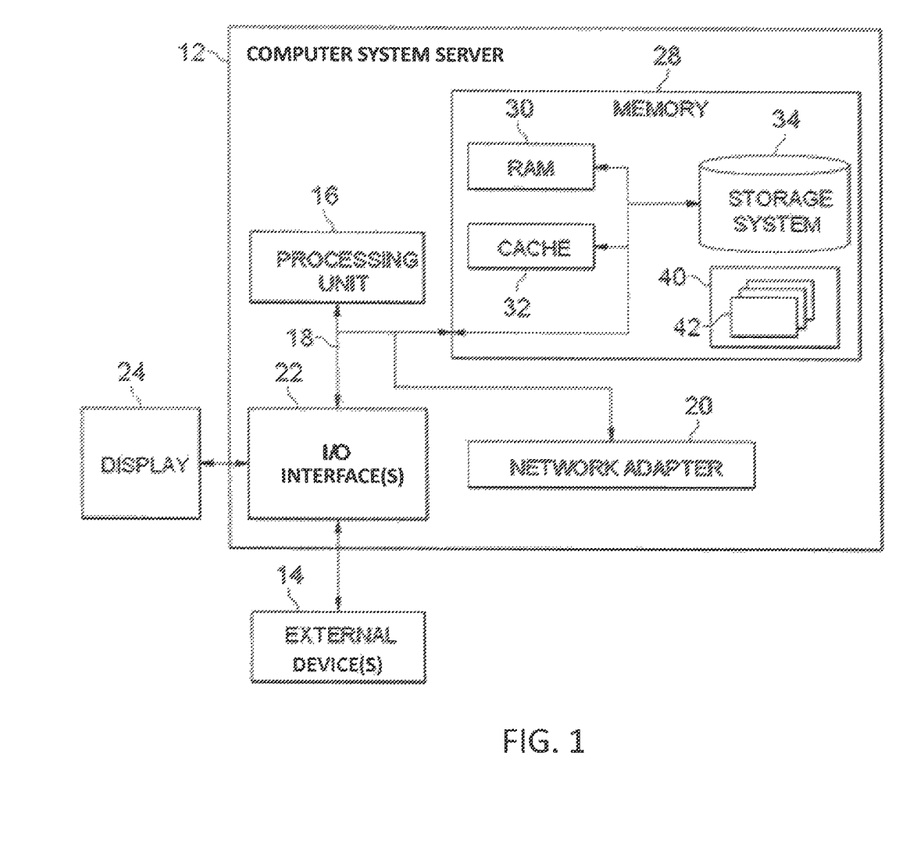
FIG. 1 shows an exemplary computer system/server, which is applicable to implementing embodiments of the present invention.

FIG. 1 illustrates an exemplary computer system/server 12, which is applicable to implementing embodiments of the present invention. Computer system/server 12 is only illustrative and is not intended to suggest any limitation as to the scope of use or functionality of embodiments of the invention described herein.

As shown in FIG. 1, the computer system/server 12 is shown in the form of a general-purpose computing device. The components of the computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples of these other hardware and/or software components include, but are not limited to: microcode, device drivers, redundant processing units, external disk drive arrays, RAID systems, tape drives, and data archival storage systems.

Figure 2:
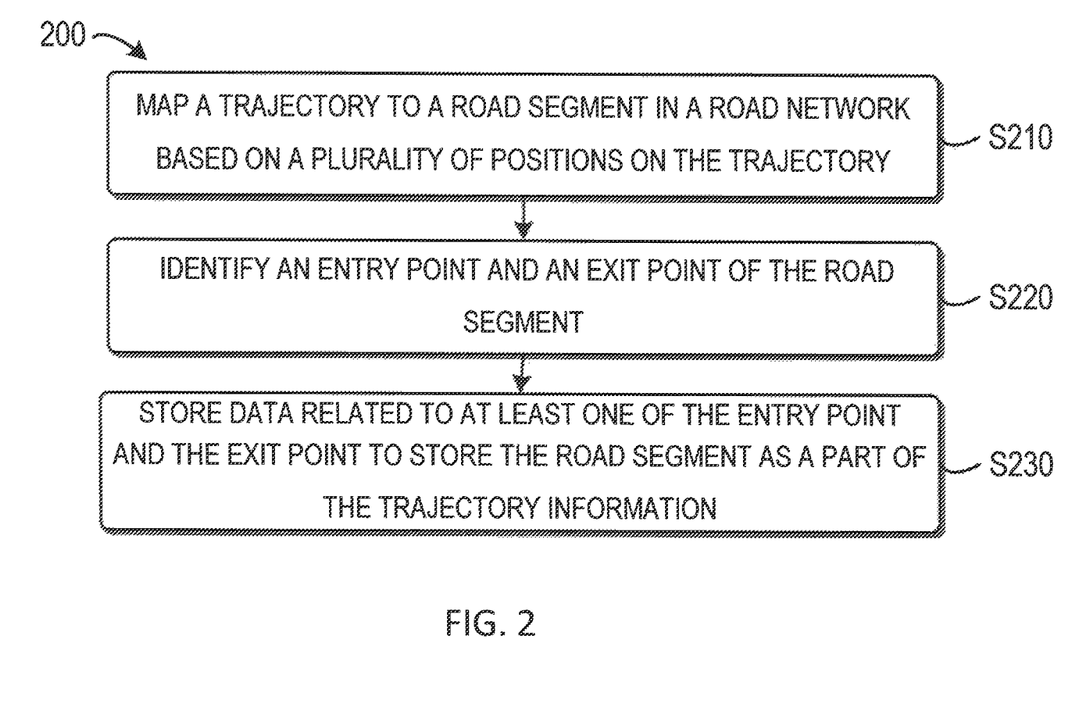
FIG. 2 shows a schematic flow chart of a method for storing a trajectory according to embodiments of the present invention.

FIG. 2 shows a flow chart of a method 200 for storing a trajectory according to embodiments of the present invention. The method 200 starts from step S210, where based on a plurality of positions on a trajectory of an entity, the trajectory is mapped to at least one road segment in a road network.

The term "entity" used here refers to a pedestrian, a vehicle and/or any other person or device that can collect position data. The term "trajectory" used here refers to a traveling route of an entity during a moving process. The term "road network" refers to a kind of map that at least contains road or traffic route information within a relevant geographical area. The road network includes a plurality of road segments representing route information.

In one embodiment, during the process of entity movement, a positioning/navigation device (e.g., a GPS receiver) associated with an entity senses the position of the entity. Such positions form a trajectory of the entity. In one embodiment, the positioning/navigation device periodically senses the position data of the entity according to a given time interval. In another embodiment, the position data is also continuously obtained. The position data may be stored at the entity locally, and/or stored in a remote machine (e.g., a server) of the entity. Alternatively or additionally, the position data of the entity during the traveling process is obtained from a third party.

In one embodiment, the position data, for example, may comprise latitude/longitude and altitude coordinates. Other forms of position data are also feasible. Alternatively, in one embodiment, for a position of the entity in a trajectory, the position data indicates one or more of the following: the time or time instant when the entity arrives at the position, the movement speed of the entity at the position, and the movement direction of the entity at the position (e.g., a particular angular heading).

A plurality of positions on the trajectory are mapped on a road network, such that each position corresponds to one point in the road network. According to embodiments of the present invention, any appropriate technology may be used to complete a mapping of the trajectory to the road network. For example, in one embodiment, a map matching technology is used. Given a trajectory represented by a plurality of positions, the map matching process may determine points corresponding to these positions in the road network by coordinate transformation, and find paths in the road network that match the trajectory.

Various map matching technologies may be used in conjunction with embodiments of the present invention. For example, in one embodiment, a matching degree between a trajectory and a path may be determined using a cross-correlation method. Alternatively, a sequential detection method, a hierarchical search method, or an edge feature matching method may be employed to match the trajectory to the path. Alternatively, besides path matching the trajectory, in one embodiment, the map matching process provides a matching degree between the trajectory respective road segments in the matching path.

Figure 3:
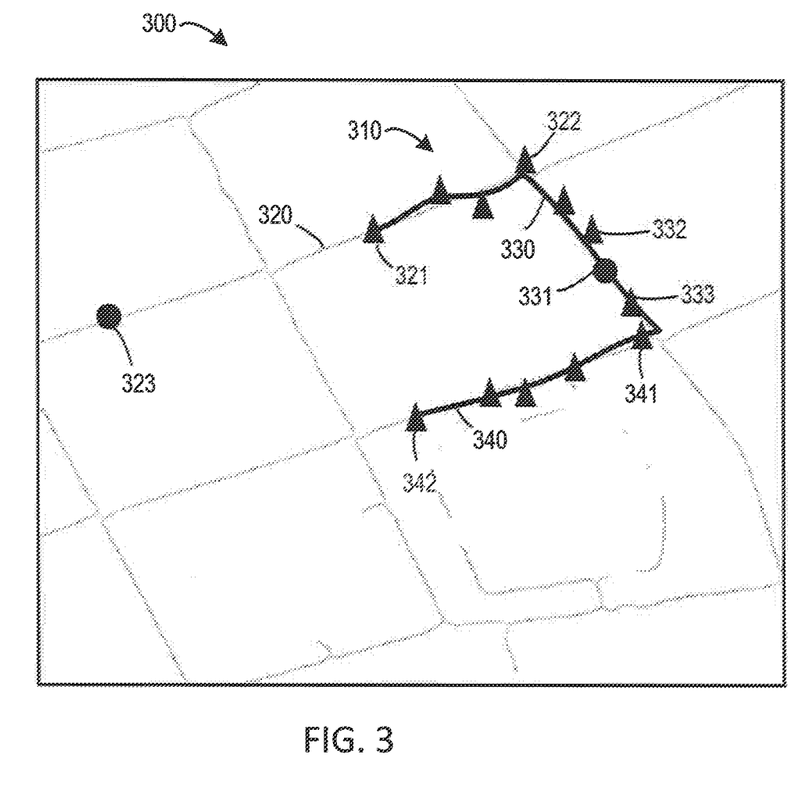
FIG. 3 shows a diagram of a trajectory being mapped to a road network according to embodiments of the present invention.

It would be appreciated that the trajectory will involve one or more road segments in the road network. FIG. 3 shows a schematic diagram of a trajectory 310 being mapped on the road network 300. In this example, the trajectory 310 involves three road segments 320, 330 and 340 in the road network 300. As shown in the figure, points corresponding to the positions on the trajectory (represented by triangles) are distributed on these road segments.

Referring back to FIG. 2, the method 200 then proceeds to step S220. In step S220, for any given road segment involved in the trajectory, a point from which the entity starts traveling along the road segment (called "entry point") and/or a point at which the entity ends traveling along the road segment (called "exit point") may be identified. In this way, according to embodiments of the present invention, storage of the trajectory may be completed with the road segments in the road network as a unit.

For example, in an embodiment using map matching, as mentioned above, the map matching process indicates a point corresponding to each position in the trajectory is mapped to which road segment in a road network on the map. Therefore, for a road segment, all continuous points being mapped to the road segment may be ordered as per the time of position sensing. The earliest sensed point may be identified as an entry point of the segment, while the latest sensed point may be identified as an exit point of the road segment. For example, in the example shown in FIG. 3, for the road segment 320, the entity starts traveling along the road segment at the entry point 321 and ends traveling along the road segment at the exit point 322.

It should be understood that during the traveling process of the entity, it may possibly experience the same road segment more than once. In other words, the entity may enter and/or exit the road segment. Therefore, one road segment may have multiple entry points and/or multiple exit points. In this case, according to embodiments of the present invention, each pair of entry point and exit point may be processed and stored, respectively.

Next, in step S230 of the method 200, for each to-be-stored road segment involved in the path, data related to at least one point in an entry point and an exit point of the road segment is stored, so as to store the road segment as a part of information of the trajectory of the entity.

For example, in one embodiment, positions of the entry point and/or exit point are stored. With the entry point as an example, in one embodiment, the position of the entry point may be indicated by an offset distance of the entry point with respect to a known point of the road segment. The term "known point" used here refers to a point having a known position on the road segment.

For example, in one embodiment, a start point of a road segment may be used to act as the known point. With reference to FIG. 3, for the road segment 320, the position of the entry point 321 may be represented as an offset distance of the entry point 321 with respect to the start point 323 of the road segment 320. In the description below, for ease of discussion, a known point of a road segment may be described as the start point of the road segment. However, it is only an example and not intended to limit the scope of the present invention. In other embodiments, an end point, a turn point, a point of interest (POI) or any other point having a known position of the road segment may act as a known point.

When the position is represented by an offset distance, the data of latitude/longitude and altitude do not need to be stored. Instead, it is only necessary to store the offset distance. As a result, the volume of data to be stored may be significantly reduced. However, it should be understood that it is not compulsory to use the offset distance to represent the position of the entry point. For example, the latitude/longitude and altitude coordinates of the entry point may instead be directly stored.

Besides the offset distance, in one embodiment, the time instant when the entity arrives at the entry point is stored, which indicates time information about entry of the entity into the current road segment. For example, in one embodiment, a positioning/navigation device such as a GPS receiver obtains the sensed time of the position data. Alternatively, in one embodiment, the time instant when the entity arrives at the entry point is also obtained using a timer.

In a similar manner, data related to the exit point of the road segment may be obtained, e.g., including the time instant when the entity leaves the exit point, the position of the exit point, etc. In particular, the position of the exit point may be likewise represented by an offset distance of a known point on the road segment. In the context of the present disclosure, the distance between two points may be a path distance between the two points in the road network. Alternatively, the distance may be a straight-line distance between two points or any other appropriate distance.

As an example, in one embodiment, Table 1 shows a data table for storing the trajectory 310 as shown in FIG. 3. In this example, for each of the road segments 320, 330, and 340 involved in the trajectory 310, a time instant when the entity arrives at the entry point ("entry time"), the position of the entry point ("entry position"), the time instant when the entity leaves the exit point ("exit time"), and the position of the exit point are stored. In particular, in this example, the positions of the entry point and the exit point are represented by an offset distance with respect to the start point on the corresponding road segment.

TABLE 1

| Trajectory | Road segment | Entry time | Entry position | Exit time | Exit position |
| --- | --- | --- | --- | --- | --- |
| 310 | 320 | 2013-10-12 10:01:20 | 231 m | 2013-10-12 10:02:01 | 342 m |
|  | 330 | 2013-10-12 10:02:02 | 31 m | 2013-10-12 10:03:03 | 142 m |
|  | 340 | 2013-10-12 10:03:04 | 245 m | 2013-10-12 10:04:11 | 397 m |

It should be understood that Table 1 is for the purpose of illustrating the data storage mechanism according to embodiments of the present invention, and not intended to limit the specific data structure. In an alternative embodiment, any appropriate data structure may be used to implement an actual storage of data. Moreover, according to the actual application needs, other data related to a road segment or points thereon may be stored. For example, the speed and direction of the entity at the entry point and/or exit point may be stored.

In this way, the road segment information provided by the road network is utilized in storing the trajectories. First, a road segment may be represented by only storing at most two points. According to embodiments of the present invention, the trajectory can be stored using the end points of the trajectory even if the trajectory or road segment is not a straight line segment. The road segment may have any shape. In subsequent query, the shape of the road segment will be provided by the road network, thereby determining the modality of the trajectory. Moreover, as mentioned above, for an entry point and an exit point of any road segment, their positions may be stored with an offset distance with respect to a known point (e.g. start point) on the road segment, thereby reducing the data volume that needs to be stored.

In one embodiment, in order to further enhance the data compression ratio, in step S230, the road segment is stored based on connectivity information about the road segment provided by the road network per se. Still with reference to FIG. 3, for the travel trajectory 310, the road segment 320 is an initial road segment. In other words, the entry point 321 of the road segment 320 is the start point of the whole trajectory 310. In this case, relevant data of the entry point 321 needs to be stored, e.g., arrival time and position.

However, for the exit point 322 of the road segment 320, repetitive storage may be avoided using the connectivity information between road segments. Specifically, based on the temporal relationship between the exit point of the road segment 320 and the entry point of the road segment 330, it may be determined that the road segment 330 is a next neighboring road segment of the road segment 320. Therefore, the position of the intersection point between the road segments 320 and 330 on the road network may be estimated as a position of the exit point 322 of the road segment 320.

Because the position of the intersection point is provided by the road network per se, it is unnecessary to store the position of the exit point 322.

Additionally, when the entity keeps continuous traveling, the time instant when the entity leaves the road segment 320 and the time instant when the entity enters into a next adjacent road segment 330 will be very close, or even overlapping (the case in FIG. 3). In one embodiment, in storing the road segment 320, the arrival time at the exit point 322 is not stored. This is because the arrival time of the entry point will be stored when storing the next adjacent road segment 330, and this arrival time can be approximately estimated as the arrival time of the exit point 322 of the road segment 320.

In sum, in one embodiment, for the start road segment 320, only the arrival time and location of the entry point 321 need to be stored. If desired, it is also feasible to store relevant data of the exit point 322. In this case, when storing the next adjacent road segment 330, the data of the entry point is not stored.

Still with reference to FIG. 3, for the trajectory 310, the road segment 330 is a middle road segment. In other words, the entry point of the road segment 330 is not the start of the trajectory, and the exit point of the road segment 330 is not the end of the trajectory. Similar to the initial road segment, for the middle road segment 330, the data of the exit point needn't be stored, because the data of the exit point of the middle road segment may be stored when storing the next adjacent road segment. In one embodiment, it is also feasible to store the data of the exit point of the middle road segment.

For the entry point of the middle road segment 330, in one embodiment, only the arrival time at the entry point needs to be stored, without the need to store the position of the entry point. Similar to the exit point 322 of the road segment 320, the position of the intersection point between the road segment 330 and the previous road segment 320 may be used as the position of the entry point of the road segment 330. The position of an intersection point may be provided by a static map/road information of the road network, without a need of extra storage.

For the trajectory 310, the road segment 340 is an end road segment. In other words, the exit point 342 of the road segment 340 is the end point of the whole trajectory 310. For the end road segment, in one embodiment, the arrival time of the entry point is stored. In particular, because the exit point 342 where the entity leaves the road segment 340 is just the end of the trajectory 310, the arrival time and position of the exit point 342 will be stored.

By taking the road segment information provided by the road network into consideration, the data volume that needs to be stored may be further reduced. In this way, less storage space may be used to implement effective storage of the trajectory. As an example, in this embodiment, Table 1 described above may be simplified into the following table 2. In table 2, the data indicated with the slash line "\" needn't be stored. These data may be derived in subsequent query based on other stored data and/or road information provided by the road network.

TABLE 2

| Trajectory | Road segment | Entry time | Entry position | Leaving time | Leaving position |
|---|---|---|---|---|---|
| 310 | 320 | 2013-10-12 10:01:20 | 231 m | \ | \ |
|  | 330 | 2013-10-12 | \ | \ | \ |

TABLE 2-continued

| Trajectory | Road segment | Entry time | Entry position | Leaving time | Leaving position |
|---|---|---|---|---|---|
|  | 340 | 10:02:02 2013-10-12 10:03:04 | \ | 2013-10-12 10:04:11 | 397 m |

With the method 200, the trajectory of the movement of the entity can be stored with less data. This helps to save storage resources and enhance subsequent query efficiency. However, this data compression also causes certain data loss. For example, in the example shown in FIG. 3, for road segment 320, the data between the entry point 321 and the exit point 322 (e.g., including position, speed, time, etc.) will be lost. However, in some cases, the user possibly needs to query data of one or more points other than the entry point 321 and the exit point 322. For example, a common query is querying the time and/or speed of the entity when arriving at a particular point on the road segment.

In order to support this query, in one embodiment, a specific hypothesis is used to infer the traveling speed of the entity. For example, it may be assumed that the entity travels at a constant speed on a to-be-queried road segment or travels according to a known given acceleration, etc. In this way, data of other given points on the arrival road segment of the entity may be estimated.

Figure 4:
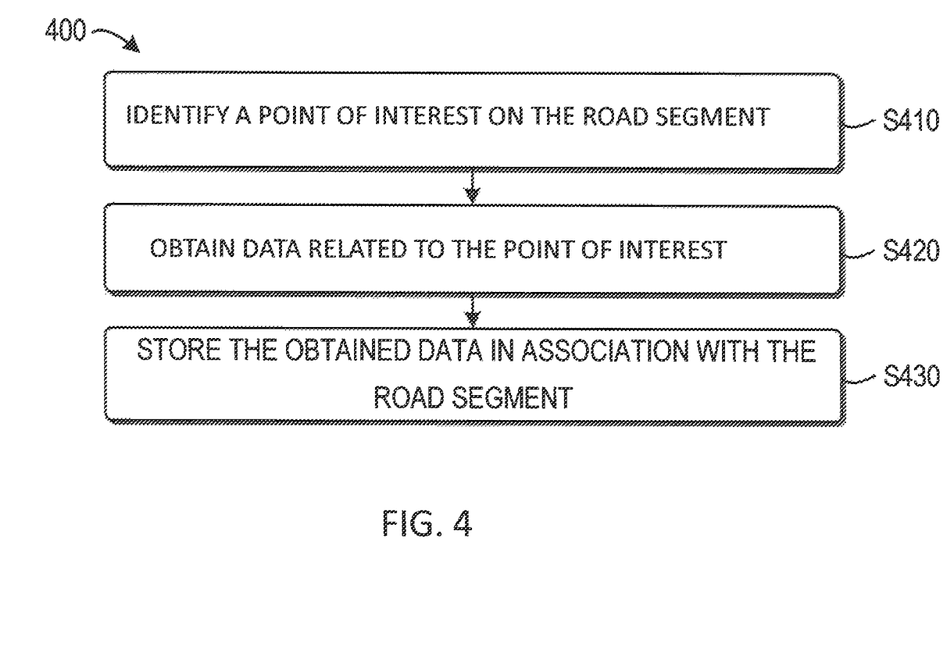
FIG. 4 shows a schematic flow chart of a method for identifying and storing road segment points of interest according to embodiments of the present invention.

Alternatively or additionally, in order to support a more accurate and efficient user query, in one embodiment, when storing a road segment, data of one or more points of interest other than the entry point and/or exit point on the road segment are additionally stored. FIG. 4 shows a schematic flow diagram of a method 400 for identifying and storing road segment points of interest according to embodiments of the present invention.

The method 400 starts from step S410, where one or more points of interest on the to-be-stored road segment are identified. A point of interest used here may refer to a very important or significant point on a road segment. These points are expected to be possibly queried in the future. According to embodiments of the present invention, the points of interest may be identified in various ways.

For example, in one embodiment, the points of interest comprise points related to the road characteristics of the road segment per se. The road characteristics refer to characteristics related to factors such as the shape of the road, road condition, surrounding landform, and the traffic condition. For example, the points of interest may include, but not limited to, one or more points in a road segment such as a turn point, an intersection point, a point of interest (POI), a hazardous point (e.g., a point with a particular landform), or a point with a predetermined traffic condition (e.g., a jam point or a point with a high occurrence frequency of traffic accidents). In such an embodiment, in step S410, road information related to a road segment provided by the road network and/or any third party may be analyzed so as to identify such points of interest.

Alternatively or additionally, in one embodiment, the point of interest includes points associated with an entity's behavior characteristics on the road segment. In other words, the point of interest may be a point where the entity performs a predetermined particular behavior. For example, the points of interest may include, but not limited to, one or more of the following: a point where the entity's movement speed changes, a point where the entity stops, a point where the entity performs actions such as emergency braking, and whistling. In this embodiment, in step S410, the behavior data of the entity may be captured using a positioning/navigation device and/or any other appropriate sensor (e.g., a camera, a microphone, etc.). Then, a corresponding point of interest may be identified by analyzing the captured behavior data.

The method 400 subsequently proceeds to step S420. In step S420, for each point of interest identified at step S410, data related to a point of interest to be stored is obtained. In one embodiment, the obtained data related to a point of interest includes the arrival time at the point of interest, namely, the time at which the entity arrives at the point of interest. Alternatively or additionally, the information of the point of interest may include the speed of the entity at the point of interest. In step S420, it is also possible to store any other data related to the point of interest that is likely to be queried in the future, such as the movement direction of the entity.

In order to obtain the data related to the point of interest, in one embodiment, in step S420, it is determined whether the plurality of known positions of the trajectory include a matching position for the point of interest. For example, in one embodiment, if a point on the road network corresponding to a certain position in the trajectory is enough close to a point of interest (that is, the distance between the two points is less than a predetermined threshold), then that position is determined as a matching position for the point of interest. As a special case, in one embodiment, the point of interest is a mapped point on the road network corresponding to a position on the trajectory.

If there are one or more such matching positions that are enough close to the point of interest, the information of the point of interest may be determined based on relevant data of the matching positions. The relevant data of the matching position may be determined based on the to-be-stored point of interest data. Generally, the relevant data of the matching position and the relevant data of the point of interest to be obtained are of the same type. By way of example, if the data to be obtained includes the time instant when the entity arrives at the point of interest, then the data related to the matching position may include the time instant when the entity arrives at the matching position. This type of time data may be obtained by a positioning/navigation device and/or a dedicated timer. Alternatively or additionally, if the to-be-obtained data includes the position of the entity at the point of interest, then the relevant data of the matching position may include the speed of the entity at the matching position. The speed data, for example, may be obtained by another device such as the positioning/navigation device and/or a velocity meter equipped to the vehicle.

In the case of only one matching position, relevant data of the matching position may be directly used as the data related to the point of interest. If the matching positions close enough to the points of interest are more than one, in one embodiment, the data related to the point of interest to be stored is obtained by averaging data of these matching positions (including arithmetic averaging, weighted averaging, etc.). As an example, it is assumed that the data related to the point of interest is the speed of the entity at the point of interest. In this case, the average value of the speeds of the entity at multiple matching positions is calculated as the speed of the point of interest. Alternatively, in one embodiment, if the matching positions of the point of interest are more than one, a matching position closest to the point of interest is selected, and its data is used as the data related to the point of interest.

On the other hand, if there is no position matching the point of interest in a plurality of known positions on the trajectory, in one embodiment, interpolation is used in step S420 to obtain data related to the point of interest.

Specifically, in such an embodiment, a set of reference positions associated with the point of interest may be selected from a plurality of known positions of the trajectory. For example, on the road segment where the point of interest is located, a plurality of points before and after the point of interest may be selected. Particularly, in one embodiment, a point with a distance to the point of interest as near as possible may be selected. The position corresponding to the selected point is used as a reference position. Then, relevant data of each reference position (e.g., called "reference data") may be determined. Generally, the reference data and the relevant data of the to-be-obtained point of interest are of the same kind. For example, if the to-be-obtained data includes the time instant when the entity arrives at the point of interest, the reference data may include the time instant when the entity arrives at the reference position. For example, if the to-be-obtained data includes the position of the entity at the point of interest, then the reference data may include the speed of the entity at the reference position. These reference data may be interpolated to thereby determine the to-be-stored data related to the point of interest. For the sake of discussion, with the exception of the arrival time, the times of the entity arriving at respective reference positions may be entered to the interpolation operation, with its results as the time instant when the entity arrives at the point of interest.

By virtue of the characteristics of the interpolation operation, accurate estimation of the data of the point of interest may be obtained. According to embodiments of the present invention, the interpolation operation may include but is not limited to, linear interpolation, double linear interpolation, and spline interpolation.

Next, the method 400 proceeds to step S430, where data of the point of interest is stored in association with the road segment where the point of interest is located. For example, the stored data may include the time instant when the entity arrives at the point of interest or the speed of the entity at the point of interest. As an example, table 3 below shows an example of storing data related to the point of interest.

TABLE 3

| Trajectory | Road segment | Entry time | Entry position | Exit time | Exit position | Type |
|---|---|---|---|---|---|---|
| 310 | 320 | 2013 Oct. 12 10:01:20 | 231 m | \ | \ | Substantially |
|  | 330 | 2013 Oct. 12 10:02:02 | \ | \ | \ | Substantially |
|  | 340 | 2013 Oct. 12 10:03:04 | \ | 2013 Oct. 12 10:04:11 | 397 m | Substantially |
| 310 | 330 | 2013 Oct. 12 10:21:01 | 451 m |  |  | Jam point |

Compared with table 2, table 3 adds a "type" field, for indicating the type of the stored data. In one embodiment, for road segment data in the trajectory, its type field is set to "substantially." Specifically, the first three lines in table 3 are used for storing road segments 320, 330, and 340, respectively. Therefore the values of the first three lines of "type" field are set to "substantially."

For points of interest on the road segment, the value of its "type" field may be correspondingly set dependent on different points of interest. In table 3, the last line is used for recording the point of interest 331 on the road segment 330 shown in FIG. 3. In this example, the type of the point of interest is indicated as "jam point." As an example, the point of interest 331 may be identified by monitoring and analyzing the traffic condition of the road segment 330.

As an example, suppose the point of interest 331 is not a point corresponding to a known position on the travelling trajectory 310. In other words, the position and arrival time of the point of interest 331 are not obtained during the position sensing process. In this case, the offset distance of the point of interest 331 with respect to the road segment 330 may be determined based on the map/road information of the road network. The arrival time of the point of interest 331 may be determined using the method described above with reference to FIG. 4. Specifically, in one embodiment, for example, the positions corresponding to points 332 and 333 distributed on the road segment 330 may be selected as reference positions. Correspondingly, the time instant when the entity arrives at the point of interest 331 may be estimated by interpolating the arrival time of the reference positions.

With the method 400, a data compression ratio may be appropriately adjusted when storing the trajectory, and the efficiency and accuracy of subsequent query may be enhanced by adding a plurality of points of interest. For example, when the user subsequently queries the information such as arrival time and speed associated with the point of interest, accurate feedback may be directly provided from the stored data. In this way, a good balance may be achieved between data compression ratio and query efficiency/accuracy.

Figure 5:
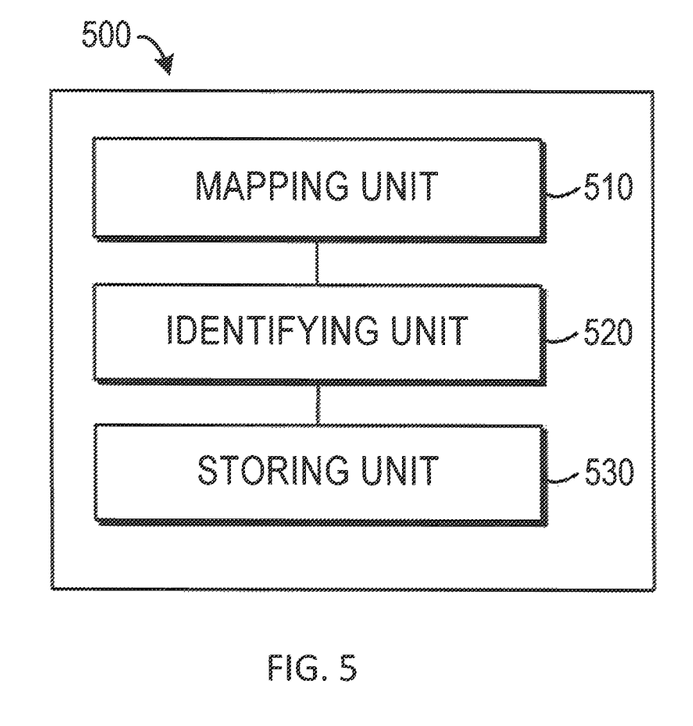
FIG. 5 shows a schematic block diagram of a system for storing a trajectory according to embodiments of the present invention.

FIG. 5 shows a schematic block diagram of a system 500 for storing a trajectory according to embodiments of the present invention. As shown in the figure, the system 500 comprises: a mapping unit 510 configured to map, based on a plurality of positions on a trajectory of an entity, the trajectory to at least one road segment in a road network; an identifying unit 520 configured to identify an entry point and an exit point of the road segment, wherein the entry point is a point where the entity starts traveling along the road segment, and the exit point is a point where the entity ends traveling along the road segment; and a storing unit 530 configured to store data related to at least one of the entry point and the exit point to store the road segment as a part of information of the trajectory.

In one embodiment, the storing unit 530 comprises an initial road segment storing unit configured to, in response to the entry point being a start point of the trajectory, store at least a time instant when the entity arrives at the entry point, and an offset distance of the entry point with respect to a known point of the road segment.

In one embodiment, the storing unit 530 comprises an end road segment storing unit configured to, in response to the exit point being an end point of the trajectory, store at least a time instant when the entity arrives at the entry point, a time instant when the entity arrives at the exit point, and an offset distance of the exit point with respect to a known point of the road segment.

In one embodiment, the storing unit 530 comprises a middle road segment storing unit configured to, in response to the entry point being not a start point while the exit point being not an end point of the trajectory, store at least a time instant when the entity arrives at the entry point.

In one embodiment, the system 500 further comprises: a point of interest identifying unit configured to identify a point of interest on the road segment; a point of interest data obtaining unit configured to obtain data related to the point of interest; and a point of interest data storing unit configured to store the data in association with the road segment.

In an embodiment, the functions of the mapping unit 510 and/or the identifying unit 520 is performed by one or more processors, and the storing unit 530 is implemented by a storage device such as a memory.

In one embodiment, the data includes at least one of: an arrival time instant of the entity and a speed of the entity.

In one embodiment, the point of interest identifying unit includes at least one of: a road characteristic analyzing unit configured to analyze a road characteristic associated with the road segment to identify the point of interest and a behavior characteristic analyzing unit configured to analyze a behavior characteristic of the entity when traveling along the road segment to identify the point of interest.

In one embodiment, the point of interest data obtaining unit comprises a first data obtaining unit configured to determine, in response to the plurality of positions including a matching position for the point of interest, the data related to the point of interest based on data related to the matching position.

In one embodiment, the point of interest data obtaining unit comprises: a reference position selecting unit configured to, in response to the plurality of positions including no matching position for the point of interest, select a set of reference positions associated with the point of interest from the plurality of positions; a reference data obtaining unit configured to obtain data related to the reference positions; and a second data obtaining unit configured to determine the data related to the point of interest by interpolating the data related to the reference positions.

It should be noted that for the sake of clarity, FIG. 5 does not show optional units or sub-units included in the system 500. Moreover, partitioning of units or subunits in system 500 is exemplary, rather than limitative, and intended to describe its main functions or operations logically. A function of one unit may be implemented by a plurality of other units; on the contrary, a plurality of units may be implemented by one unit.

According to at least one of the above described embodiments, a trajectory of an entity such as a pedestrian or a vehicle is stored based on map/road information provided by a road network with a road segment as a unit. In this way, each road segment need only store a minimal amount of data. Moreover, based on a connectivity relationship between road segments, the data compression ratio can be further enhanced. In addition, relevant data of one or more points of interest on a road segment may be additionally stored, so as to achieve a sound balance between compression ratio and query effect.

Moreover, the units included in the system 500 may be implemented by various manners, including software, hardware, firmware or a random combination thereof. For example, in some embodiments, the apparatus may be implemented by software and/or firmware. Alternatively or additionally, the system 500 may be implemented partially or completely based on hardware. For example, one or more units in the system 500 may be implemented as an integrated circuit (IC) chip, an application-specific integrated circuit (ASIC), a system on chip (SOC), a field programmable gate array (FPGA), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of compressing trajectory data comprising a plurality of trajectory points and corresponding arrival times, the trajectory data corresponding to a plurality of road segments, the road segments comprising at least a first road segment and a last road segment different from the first road segment that is traversed last among the road segments, the method comprising:

for each road segment, identifying, by a processor of a computer, an entry point from among the trajectory points and an entry time among the arrival times;

calculating, by the processor, an entry distance between a known point along a first road segment of the road segments and the entry point of the first road segment;

for each road segment, identifying, by the processor, an exit point from among the trajectory points;

identifying, by the processor, a single exit time of only the last road segment of the road segments using the arrival times;

calculating, by the processor, a single exit distance between a known point along the last road segment and the exit point of the last road segment; and storing, by the processor, a compressed version of the trajectory data on a computer that comprises the entry times, the entry distance, the single exit time, and the single exit distance, wherein the trajectory data is received from a navigation device and corresponds to movements of an entity.

2. The method of claim 1, wherein the entity is a vehicle or a mobile device.

3. The method of claim 1, wherein the navigation device is a global positioning system (GPS) receiver.

4. The method according to claim 1, wherein the entry point is a point where the entity starts traveling along the corresponding road segment, the entry time is a time instant when the entity starts the travelling, the exit point is a point where the entity ends the travelling, and the single exit time is a time instant when the entity ends the travelling.

5. The method according to claim 1, wherein for each road segment further comprising:

identifying a point of interest on the corresponding road segment;

obtaining data related to the point of interest; and storing the data in the compressed version of the trajectory data.

6. The method according to claim 5, wherein the identifying of the point of interest on the road segment includes at least one of: analyzing a road characteristic associated with the corresponding road segment; or analyzing a behavior characteristic of the entity when traveling along the corresponding road segment.

7. The method according to claim 5, wherein the point of interest includes at least one of a turn point, an intersection point, a critical point, a point with a predetermined traffic condition, or a point where the entity performs a predetermined behavior.

8. The method according to claim 5, wherein the data includes at least one of: an arrival time instant of the entity; or speed of the entity.

9. A computer system for compressing trajectory data comprising a plurality of trajectory points and corresponding arrival times, the trajectory data corresponding to a plurality of road segments, the road segments comprising at least a first road segment and a last road segment different from the first road segment that is traversed last among the road segments, the system comprising:

a processor configured to for each road segment, identify, an entry point from among the trajectory points and an entry time among the arrival times; calculate an entry distance between a known point along a first road segment of the road segments and the entry point of the first road segment; for each road segment, identify, an exit point from among the trajectory points; identify a single exit time of only the last road segment of the road segments using the arrival times; calculate a single exit distance between a known point along the last road segment and the exit point of the last road segment; and generate a compressed version of the trajectory data that comprises the entry times, the entry distance, the single exit time, and the single exit distance; and a storage device configured to store the compressed version of the trajectory data, wherein the trajectory data is received from a navigation device and corresponds to movements of an entity.

10. The computer system of claim 9, wherein the entity is a vehicle or a mobile device.

11. The computer system of claim 9, wherein the navigation device is a global positioning system (GPS) receiver.

12. The computer system of claim 9, wherein the entry point is a point where the entity starts traveling along the corresponding road segment, the entry time is a time instant when the entity starts the travelling, the exit point is a point where the entity ends the travelling, and the single exit time is a time instant when the entity ends the travelling.

13. The computer system of claim 9, wherein the processor, for each road segment, identifies a point of interest on the corresponding road segment; obtains data related to the point of interest; and stores the data in the compressed version of the trajectory data.

14. The computer system of claim 13, wherein the processor identifies the point of interest on the road segment by analyzing a road characteristic associated with the corresponding road segment; or analyzing a behavior characteristic of the entity when traveling along the corresponding road segment.

15. The computer system of claim 13, wherein the point of interest includes at least one of a turn point, an intersection point, a critical point, a point with a predetermined traffic condition, or a point where the entity performs a predetermined behavior.

16. The computer system of claim 13, wherein the data includes at least one of: an arrival time instant of the entity; or speed of the entity.

* * * * *